United States Patent [19]

Griswold et al.

[11] Patent Number: 4,606,933
[45] Date of Patent: Aug. 19, 1986

[54] ACRYLATE-FUNCTIONAL ORGANOPOLYSILOXANES

[75] Inventors: Roy M. Griswold, Hudson; Walter L. Magee, Adrian, both of Mich.; Paul A. Manis, Allentown, Pa.; Eugene R. Martin, Onsted, Mich.

[73] Assignee: SWS Silicones Corporation, Adrian, Mich.

[21] Appl. No.: 780,105

[22] Filed: Sep. 25, 1985

[51] Int. Cl.$^4$ .............................................. B05D 3/06
[52] U.S. Cl. ................................. 427/54.1; 427/55; 428/447; 428/450; 428/452; 522/99; 528/14; 528/18; 528/26; 528/32; 528/33; 528/37; 528/38
[58] Field of Search .................. 528/14, 18, 32, 38, 528/26, 33, 37; 522/99; 427/54.1, 55; 428/447, 450, 452

[56] References Cited

U.S. PATENT DOCUMENTS

| | | | |
|---|---|---|---|
| 3,878,263 | 4/1975 | Martin | 528/32 |
| 4,201,808 | 5/1980 | Cully et al. | 525/479 |
| 4,290,869 | 9/1981 | Pigeon | 528/18 |
| 4,460,739 | 7/1984 | Ashby | 528/14 |

*Primary Examiner*—Melvyn I. Marquis

[57] ABSTRACT

Radiation polymerizable acrylate-functional organopolysiloxanes having the formula

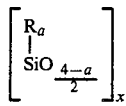

where R is a radical selected from monovalent hydrocarbon radicals, substituted monovalent hydrocarbon radicals having from 1 to 20 carbon atoms or monovalent hydrocarbonoxy radicals having from 1 to 20 carbon atoms, or a radical of the formula

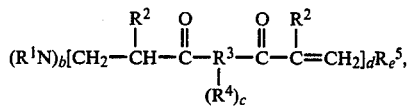

in which at least one R is a radical having the above formula, $R^1$ is a divalent radical selected from a saturated divalent hydrocarbon radical having up to 20 carbon atoms, a divalent hydrocarbonoxy radical in which the oxygen is in the form of an ether linkage and an unsaturated divalent hydrocarbon radical having from 3 to 10 carbon atoms; $R^2$ is hydrogen or a methyl radical; $R^3$ is a linear or branched radical having 2, 3, 4, 5 or 6 valences in which the radical is selected from a substituted hydrocarbon radical, or a hydrocarbon ether or thioether radical having one or more repeating units and the terminal atoms of the $R^3$ radical are selected from oxygen or nitrogen; $R^4$ is a radical linked to the terminal oxygen or nitrogen atoms of $R^3$ and is selected from the group consisting of a monovalent hydrocarbon radical having from 1 to 20 carbon atoms, an acryloyl radical, and a substituted acryloyl radical and when the terminal atom of $R^3$ is oxygen, then $R^4$ may also be hydrogen. $R^5$ is a monovalent hydrocarbon radical having from 1 to 20 carbon atoms or a radical of the formula

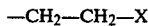

wherein X represents —COOR$^6$, —CONR$^6$, —CN, —SO$_2$R$^6$, R$^6$ is a monovalent hydrocarbon radical having from 1 to 20 carbon atoms, a is a number having an average value of 0.7 to 2.6, b is a number of from 1 to 3, c is a number of from 0 to 4, d is a number of from 1 to 4, e is a number of from 0 to 4, x is a number of from 2 to 20,000 with the proviso that b+1=d+e.

The acrylate-functional organopolysiloxanes are combined with a photosensitizer and/or peroxide and cured by radiation and/or heat.

63 Claims, No Drawings

ACRYLATE-FUNCTIONAL ORGANOPOLYSILOXANES

The present invention relates to radiation and/or heat polymerizable compositions, particularly to radiation polymerizable silicone compositions and more particularly to radiation polymerizable acrylate-functional silicone compositions.

BACKGROUND OF THE INVENTION

Radiation polymerizable acrylate-functional polysiloxanes have been described, for example, in U.S. Pat. No. 4,306,050 to Koennen, in which organopolysiloxanes having chlorine attached to silicon atoms are reacted with pentaerythritol triacrylate or pentaerythritol trimethacrylate. These compositions, however, require the use of highly irritating pentaerythritol acrylate derivatives and the acrylate group is linked to the silicon atom by a carbon-oxygen bond which is hydrolytically unstable.

U.S. Pat. No. 3,878,263 to Martin describes acrylate-functional polysiloxanes wherein the acrylate-functional group is bonded to the silicon atom via a hydrolytically stable carbon-silicon bond. However, these acrylate-functional polysiloxanes are generally slow to cure when irradiated with actinic radiation.

U.S. Pat. No. 4,201,808 to Cully describes acrylate-functional polysiloxanes wherein the degree of acrylation is increased by having acrylate groups linked to silicon atoms by silicon-carbon linkages as well as silicon-oxygen-carbon linkages; thereby enhancing the reactivity of the fluid when irradiated with actinic radiation.

U.S. Pat. No. 4,290,869 to Pigeon discloses a process for preparing photopolymerizable organopolysiloxanes by reacting hydroxy-terminated diorganopolysiloxanes with an acrylate-functional alkoxysilane in the presence of a titanate catalyst.

Generally, heat is required in preparing the acrylate-functional polysiloxanes to effect coupling of the acrylate-functional group to the siloxane or to effect removal of solvent and by-products. This has the disadvantage that the acrylate group is sensitive to heat and often induces polymerization of the acrylates.

Therefore, it is an object of this invention to provide novel acrylate-functional polysiloxanes. Another object of this invention is to provide novel acrylate-functional polysiloxanes that may be derived from polyacrylate oligomers that are less toxic than the pentaerythritol derivatives. Still another object of this invention is to provide acrylate-functional polysiloxanes in which some of the silicon atoms contain more than one acrylate group per molecule. A further object of this invention is to provide an acrylate-functional polysiloxane that is very reactive under radiation conditions even in the presence of oxygen. A still further object is to provide acrylate-functional polysiloxanes in which the acrylate containing group is bonded to the silicon atom via a silicon-carbon-nitrogen linkage. A still further object is to provide a process for making acrylate-functional polysiloxanes under conditions which do not induce polymerization of the acrylate groups. A still further object is to provide acrylate-functional polysiloxanes which are soluble in organic coating compositions.

SUMMARY OF THE INVENTION

The foregoing objects and others which will become apparent from the following description are accomplished in accordance with this invention, generally speaking, by providing acrylate-functional organopolysiloxanes having the general formula

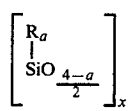

where R is selected from the group consisting of monovalent hydrocarbon radicals, substituted monovalent hydrocarbon radicals having from 1 to 20 carbon atoms, monovalent hydrocarbonoxy radicals having from 1 to 20 carbon atoms, and a radical of the formula

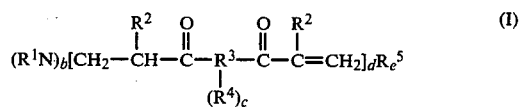

in which at least one R is a radical having the formula (I). $R^1$ is a divalent radical selected from the group consisting of a saturated divalent hydrocarbon radical having up to 20 carbon atoms, a divalent hydrocarbonoxy radical in which the oxygen is in the form of an ether linkage or an unsaturated divalent hydrocarbon radical having from 2 to 20 carbon atoms; $R^2$ is hydrogen or a methyl radical; $R^3$ is a linear or branched radical having 2, 3, 4, 5 or 6 valences in which the radical is selected from a substituted hydrocarbon radical, or a hydrocarbon ether or thioether radical having one or more repeating units and the terminal atoms of the $R^3$ radical are selected from oxygen or nitrogen; $R^4$ is a radical linked to the terminal oxygen or nitrogen atoms of $R^3$ and is selected from the group consisting of a monovalent hydrocarbon radical having from 1 to 20 carbon atoms, an acryloyl radical and a substituted acryloyl radical and when the terminal atom of $R^3$ is oxygen, then $R^4$ may also be hydrogen. $R^5$ is a monovalent hydrocarbon radical having from 1 to 20 carbon atoms or a radical of the formula

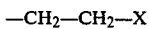

wherein X represents $-COOR^6$, $-CONR^6$, $-CN$, $-SO_2R^6$; $R^6$ is a monovalent hydrocarbon radical having from 1 to 20 carbon atoms, a is a number having an average value of 0.7 to 2.6, b is a number of from 1 to 3, c is a number of from 0 to 4, d is a number of from 1 to 4, e is a number of from 0 to 4, x is a number of from 2 to 20,000 with the proviso that $b+1=d+e$.

These compositions may be polymerized by exposure to ionizing or actinic non-ionizing radiation, such as electron beam, ultraviolet light, X-ray, gamma-ray, and beta rays.

DETAILED DESCRIPTION OF THE INVENTION

In the acrylate-functional organopolysiloxanes having the general formula

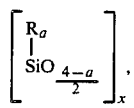

R is selected from the group consisting of monovalent hydrocarbon radicals, substituted monovalent hydrocarbon radicals having from 1 to 20 carbon atoms, monovalent hydrocarbonoxy radicals having from 1 to 20 carbon atoms, and a radical of the formula

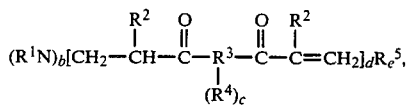

in which at least one R is a radical having the formula (I) where $R^1$, $R^2$, $R^3$, $R^4$, $R^5$, a, b, c, d, e and x are the same as above.

Examples of monovalent hydrocarbon radicals represented by R having from 1 to 20 carbon atoms are alkyl radicals such as methyl, ethyl, propyl, butyl, hexyl, octyl, dodecyl, octadecyl and eicosyl radicals; aryl radicals such as the phenyl, biphenyl and naphthyl radicals; alkenyl radicals such as the vinyl and allyl radicals; cycloalkyl radicals such as cyclobutyl, cyclopentyl and cyclohexyl radicals; alkaryl radicals such as the tolyl, xylyl and ethylphenyl radicals and aralkyl radicals such as benzyl, α-phenylethyl, β-phenylethyl and α-phenylbutyl radicals.

Examples of monovalent hydrocarbonoxy radicals represented by R are radicals of the formula (OR'), where R' is a monovalent hydrocarbon radical. The monovalent hydrocarbon radicals specified for R are also examples of monovalent radicals represented by R'.

Examples of substituted monovalent hydrocarbon radicals represented by R are the same monovalent hydrocarbon radicals described above which have been substituted with groups selected from the class consisting of a cyano radical (—CN), an acryloyloxy radical

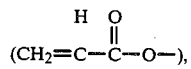

a methacryloyloxy radical

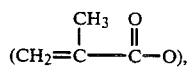

hydroxyl (OH) or a radical of the formula

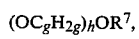

where $R^7$ is selected from the group consisting of a monovalent hydrocarbon radical having from 1 to 20 carbon atoms, an acryloyl radical

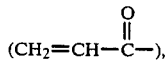

a methacryloyl radical

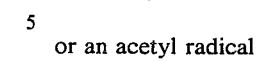

or an acetyl radical

g is a number of from 2 to 4 and h is a number of from 1 to 300.

The monovalent hydrocarbon radicals represented by $R^7$ may be the same monovalent hydrocarbon radicals as the monovalent hydrocarbon radicals represented by R.

Examples of divalent hydrocarbon radicals represented by $R^1$ having from 1 to 20 carbon atoms are alkylene radicals such as ethylene, trimethylene, tetramethylene, hexamethylene, octamethylene and eicosamethylene radicals. Examples of divalent arylene radicals are phenylene and naphthenylene radicals.

Examples of divalent hydrocarbonoxy radicals represented by $R^1$ having from 3 to 20 carbon atoms are those having the general formula $(CH_2)_d(OC_gH_{2g})_k$ where d and g are the same as above, k is a number of at least 1 and the sum of d+k is a number such that the hydrocarbonoxy radical has from 3 to 20 carbon atoms. Specific examples of divalent hydrocarbonoxy radicals are $C_3H_6(OC_2H_4)_k$, $C_3H_6(OC_3H_6)_k$ and $C_3H_6(OC_4H_8)_k$ where k is the same as above.

Examples of unsaturated divalent hydrocarbon radicals represented by $R^1$ having from 2 to 20 carbon atoms are ethenylene, propenylene, isopropenylene, 2-butenylene, sec-butenylene, 1,3-butadienylene, 2-pentenylene, 3-pentenylene, 4-propyl-2-pentenylene, 2-hexenylene, 1,4-hexadienylene, 2-octenylene, 1-hexadecenylene, 1-octadecenylene.

The $R^3$ radical is a linear or branched radical which is bonded to the carbonyl radical by oxygen or nitrogen atoms and provides sites for linking up to four additional acrylate groups. The $R^3$ radical contains carbon and hydrogen atoms, and in addtion may contain nonterminal oxygen, sulfur and nitrogen atoms; however the radical should not contain a group which will react with the primary or secondary amines.

More specifically, $R^3$ may be further represented by the formulas $R^8O_w$ or $R^9N_w$, where $R^8$ is represented by the radicals —$(CH_2)_z$—

—$(C_gH_{2g}O)_hC_gH_{2g}$—

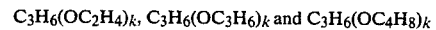

—$(CH_2)_zS(CH_2)_z$—

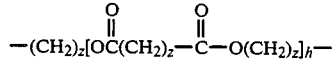

-continued g, h and e are the same as defined above, p is 0, 1 or 2, q is 0 or 1, w is a number of from 2 to 6, y is a number of from 0 to 250, z is a number of from 1 to 20.

Specific examples of $R^3$ radicals are those of the formula

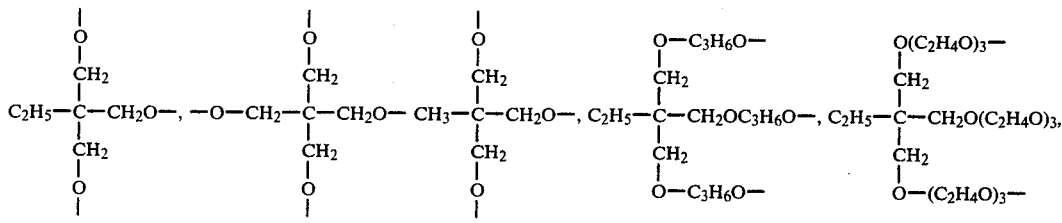

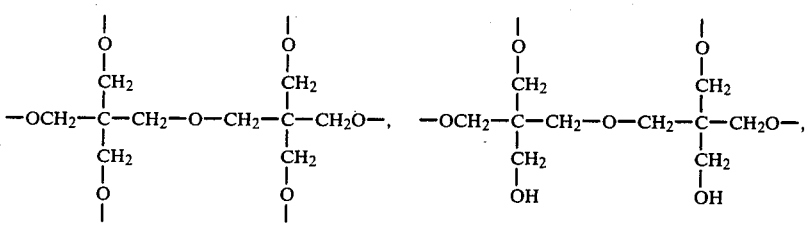

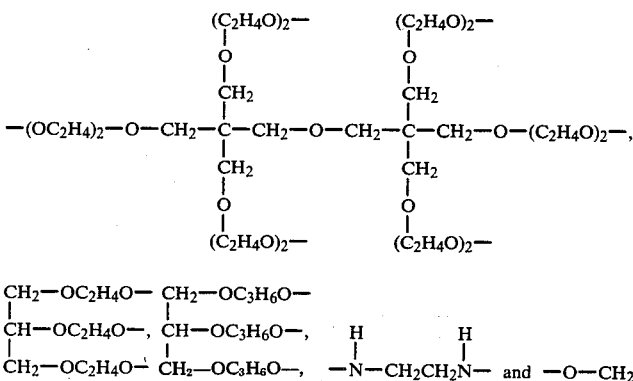

$CH_2$—$OC_2H_4O$—   $CH_2$—$OC_3H_6O$—
|                    |
$CH$—$OC_2H_4O$—,    $CH$—$OC_3H_6O$—,    H       H
|                    |                    |       |
$CH_2$—$OC_2H_4O$—   $CH_2$—$OC_3H_6O$—,  —N—$CH_2CH_2$N—  and  —O—$CH_2$—$CH_2$—S—$CH_2CH_2$—O—.

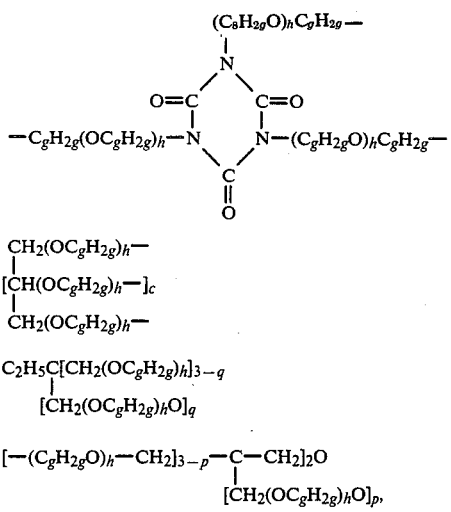

$CH_2(OC_gH_{2g})_h$—
|
$[CH(OC_gH_{2g})_h$—$]_c$
|
$CH_2(OC_gH_{2g})_h$—

$C_2H_5C[CH_2(OC_gH_{2g})_h]_{3-q}$
|
$[CH_2(OC_gH_{2g})_hO]_q$ $[$—$(C_gH_{2g}O)_h$—$CH_2]_{3-p}$—$C$—$CH_2]_2O$
|
$[CH_2(OC_gH_{2g})_hO]_p$, where the unsatisfied valences of $R^8$ are satisfied by oxygen and/or nitrogen atoms and $R^9$ is represented by the formula —$(CH_2)_z(CH)_{6-e}(CH_2)_z$—,
|

The $R^4$ radical is selected from the group consisting of a monovalent hydrocarbon radical having from 1 to 20 carbon atoms, an acryloyl radical, or a substituted acryloyl radical and when the terminal atom of $R^3$ is oxygen, the $R^4$ may also be hydrogen.

The monovalent hydrocarbon radicals specified for R above are representative examples of $R^4$.

Specific examples of $R^4$ radicals are $$-\overset{O}{\underset{\|}{C}}-CH=CH_2 \text{ and}$$

$$-\overset{O}{\underset{\|}{C}}-\overset{CH_3}{\underset{|}{C}}=CH_2.$$

The $R^5$ radical is a monovalent hydrocarbon radical having from 1 to 20 carbon atoms or a radical of the formula

—$CH_2$—$CH_2$—X, where X represents a group of the formula —$COOR^6$, —$CONR^6$, —CN and —$SO_2R^6$, where $R^6$ is a monovalent hydrocarbon radical having from 1 to 20 carbon atoms.

The monovalent hydrocarbon radicals represented by R above are equally applicable to the monovalent hydrocarbon radicals represented by $R^6$.

Further examples of radicals represented by $R^6$ are substituted monovalent hydrocarbon radicals wherein the substituents are selected from the class consisting of hydroxy (—OH), cyano (—CN) or the group having the formula $(OC_gH_{2g})_hOR^7$, where $R^7$ is hydrogen or a monovalent hydrocarbon radical having from 1 to 20 carbon atoms, g is a number of from 2 to 4 and h is a number of from 1 to 300.

The examples of monovalent hydrocarbon radicals given for R above are equally applicable to the monovalent hydrocarbon radicals represented by $R^7$.

The acrylate-functional organopolysiloxanes having at least one unit of the formula

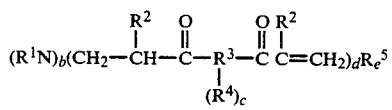

where $R^1$, $R^2$, $R^3$, $R^4$, $R^5$, b, c, d and e are the same as above, may be prepared by reacting aminofunctional organopolysiloxanes having a primary or secondary amine bonded to a silicon atom via the $R^1$ radical with an acrylate containing compound selected from polyacrylates and mixtures of polyacrylates and monoacrylates.

Examples of suitable polyacrylate compounds which may be employed are trimethylolpropane triacrylate, 1,6-hexanediol diacrylate, 1,4-butanediol dimethacrylate, poly(butanediol) diacrylate, tetraethylene glycol dimethacrylate, trimethylol propane triethoxytriacrylate, pentaerythritol triacrylate, glycerylpropoxytriacrylate, N,N'-methylenebisacrylamide, pentaerythritol tetracrylate, 2,2'-thiodiethanol diacrylate and 2,2' thiodiethanol dimethacrylate.

Suitable examples of mono-acrylate compounds which may be employed with the polyacrylates are ethylacrylate, hydroxypropyl methacrylate, methylmethacrylate, stearylacrylate, isobornyl acrylate, dicyclopentyl acrylate, allylacrylate, dimethylaminoethylacrylate, polyethylene glycol monomethacrylate, N,N-dimethyl acrylamide quaternized products of diethyl aminoethylacrylate and the like.

Suitable examples of aminofunctional organopolysiloxanes having primary and secondary amine groups are those polysiloxanes having at least one unit of the formula

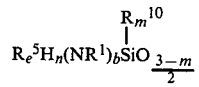

wherein $R^1$, $R^5$, b and e are the same as above, $R^{10}$ is a monovalent hydrocarbon radical having from 1 to 20 carbon atoms, m is 0, 1 or 2 and n is a number of from 1 to 5, with the proviso that $n = b - e + 1$.

The aminofunctional organopolysiloxanes employed in the process of this invention are well known in the art. They may be prepared in accordance with the process described, for example, in U.S. Pat. No. 2,947,771 to Bailey, in which an aminofunctional silane is equilibrated with a siloxane in the presence of an alkali-metal hydroxide. Also, they may be prepared in accordance with the process described in U.S. Pat. No. 3,598,853 to Friedman et al, in which an aminofunctional silane is condensed with a silanol terminated polydiorganosiloxane. Other methods for preparing aminofunctional siloxane fluids are described in U.S. Pat. Nos. 3,890,269 to Martin; 2,930,809 to Jex et al and 3,045,036 to Jex et al. The aminofunctional siloxanes described in these references and their methods of preparation are incorporated herein by reference.

The acrylate-functional organopolysiloxanes are prepared by mixing the acrylate-containing compounds with an aminofunctional organopolysiloxane at a temperature of from about 25° C. up to about 150° C. in the presence or absence of an organic solvent. Examples of suitable solvents are aliphatic hydrocarbons such as hexane, heptane, octane and aromatic hydrocarbons such as benzene, toluene and xylene.

The amount of acrylate-containing compound admixed with the aminofunctional organopolysiloxane is such that the molar ratio of acrylate groups of the acrylate compound to the amine groups of the aminofunctional organopolysiloxane is between 0.75 to 10 and more preferably from about 1 to 5 moles of acrylate containing compound per mole of amine group.

The reaction may be conducted at atmospheric pressure or at pressures above as well as below atmospheric pressure. It is, however, preferred that the reaction be conducted at atmospheric pressure.

The acrylate-functional organopolysiloxanes of this invention may also be prepared by reacting acrylate functional aminosilanes having at least one hydrocarbonoxy group linked to a silicon atom with a hydroxyl containing organopolysiloxane in the presence of a catalyst which promotes the reaction of the silicon bonded hydrocarbonoxy group with the hydroxyl group on the organopolysiloxane.

The reaction between the acrylate-functional aminosilanes and the hydroxyl-containing organopolysiloxanes may be conducted at a temperature of from about 25° C. up to about 175° C. in the presence or absence of a catalyst and in the presence or absence of a solvent.

The molar ratio of the acrylate-functional aminosilanes to hydroxyl-containing organopolysiloxanes may range from about 0.5 to 6 and more preferably from 0.3 to 3.

Generally, catalysts which do not promote equilibration of the organopolysiloxane are preferred. Examples of suitable catalysts are primary, secondary and tertiary amines such as dimethylamine, trimethylamine, triethylamine, propylamine, dipropylamine and dibutylamine, and lithium compounds, such as lithium hydroxide, lithium methoxide, vinyl lithium and butyl lithium.

The amount of catalyst is not critical and may be present in sufficient amount to promote the condensation between the hydrocarbonoxy group linked to the silicon atom and the SiOH group. Amounts of from 0.1 to 10 percent by weight of catalyst based on the weight of the acrylate-functional aminosilane and hydroxyl-containing organopolysiloxane are sufficient. Preferably the amount of catalyst ranges from 0.1 to about 2 percent by weight based on the weight of the acrylate-functional aminosilane and hydroxyl-containing organopolysiloxane.

In some cases it may be advantageous to employ an inert solvent in the reaction. Examples of suitable solvents are aliphatic hydrocarbons such as hexane, heptane and octane; cyclic aliphatic hydrocarbons such as cyclohexane and monomethylcyclohexane; aromatic hydrocarbons such as benzene, toluene and xylene; halogenated alkanes such as methylene chloride and 1,1,1-trichloroethane; mineral spirits or esters such as ethyl acetate.

The acrylate-functional organopolysiloxanes may be conveniently prepared by mixing the acrylate-functional aminosilanes with the hydroxyl-containing organopolysiloxanes at room temperature in the presence or absence of atmospheric moisture. Preferably the reaction is conducted in the presence of an inert atmosphere at atmospheric pressure, although pressures below or above atmospheric pressure may be employed.

It is preferred that the alcohol formed as a result of the condensation reaction be removed by distillation. Preferably, the alcohol is distilled off by using a solvent that azeotropes with the alcohol.

The acrylate-functional aminosilanes having at least one hydrocarbonoxy group linked to a silicon atom which are reacted with the hydroxyl-containing organopolysiloxanes are prepared by reacting an acrylate containing compound selected from polyacrylates and mixtures of polyacrylates and monoacrylates with an aminofunctional silane of the formula

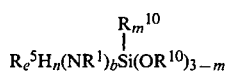

where $R^1$, $R^5$, $R^{10}$, b, e, m and n are the same as above at a temperature of from about 25° C. up to about 125° C. in the presence or absence of an organic solvent. Examples of suitable solvents are aliphatic hydrocarbons such as hexane, heptane, octane and aromatic hydrocarbons such as benzene, toluene and xylene.

The molar ratio of acrylate-containing compound to the amine group present in the aminofunctional silane is not critical and may range from about 0.75 to 10 moles of acrylate-containing compound per mole of amine group.

Specific examples of aminofunctional silanes which may be reacted with the acrylate compounds are beta-aminopropyltrimethoxysilane, gamma-aminopropyltriethoxysilane, methyl-beta-(aminoethyl)-gamma-aminopropyldimethoxysilane, omega-aminohexyltributoxysilane, beta-(aminoethoxy)hexyltriethoxysilane, beta-(aminoethoxy)propyltrimethoxysilane, beta-(aminopropoxy)butyltributoxysilane, methyl-beta(aminopropoxy)propyldi(aminoethoxy)silane, gamma-aminopropylethyldiethoxysilane, gamma-aminopropylphenylethoxysilane and gamma-aminoisobutylmethyldiethoxysilane.

Although the reaction between the acrylate-containing compounds and the aminofunctional silanes may be conducted at atmospheric pressure, pressures below or above atmospheric pressure may be employed. Preferably, however, the reaction is conducted at atmospheric pressure.

Hydroxyl-containing organopolysiloxanes employed in the preparation of acrylate-functional organopolysiloxanes have the average formula

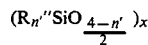

where R" is a monovalent hydrocarbon radical having from 1 to 20 carbon atoms or a hydroxyl radical, in which at least one R" and preferably at least two R" radicals are hydroxyl radicals, n' has an average value of from about 1.8 to 2.2 and x is the same as above.

Specific examples of monovalent hydrocarbon radicals represented by R" may be the same as the examples given for R, when R represents a monovalent hydrocarbon radical.

The hydroxyl-containing organopolysiloxanes preferably have viscosities of from about 50 to about 500,000 mPa.s at 25° C. and more preferably from about 100 to about 100,000 mPa.s at 25° C.

Specific examples of hydroxyl-containing organopolysiloxanes are hydroxyl-terminated dimethylpolysiloxanes, methylphenylpolysiloxanes, diphenylpolysiloxanes, diethylpolysiloxanes, methylpropylpolysiloxanes and copolymers of dimethylsiloxane and methylphenylsiloxane or diphenylsiloxane units.

The acrylate-functional organopolysiloxanes may also be prepared by reacting the acrylate-functional aminosilane described above, with a cyclic trisiloxane in the presence of a lithium compound.

Examples of suitable cyclic trisiloxanes which may be used in this invention are hexamethylcyclotrisiloxane, hexaphenylcyclotrisiloxane, 1,3,5-trimethyl-1,3,5-triphenylcyclotrisiloxane and 1,3,5-trimethyl-1,3,5-trivinylcyclotrisiloxane.

Catalysts which may be employed to promote the reaction are compounds such as lithium hydroxide, lithium hydride, ethyllithium, butyllithium, vinyllithium, phenyllithium and lithium naphthalene and lithium silanolate, with the preferred catalyst being lithium silanolate.

The amount of catalyst is not critical and may range from about 0.0001 percent up to about 10 percent by weight of catalyst based on the weight of the reactants employed in the equilibration.

Generally, it is preferred that the catalyst be removed or destroyed after the reaction is completed because the presence of the catalyst may adversely affect the properties of the resulting polymer. The catalyst, for example, may be removed by washing with water or it may be destroyed by neutralizing with an acid, such as acetic acid.

The reaction may be conducted at any temperature ranging from about 70° C. up to about 150° C. over a period of time of from about 0.5 hours up to about 3 hours and more preferably at a temperature of from 80° to 125° C. for about 2 hours in the presence or absence of a solvent. It is preferred that the reaction be conducted in an inert atmosphere in the absence of a solvent.

Solvents which may be employed, if desired, are hydrocarbons such as xylene or toluene; tertiary amines, such as triethylamine, tributylamine, pyridine and the like. Other suitable solvents are dimethyl sulfoxide, dioxane, ethers, such as diethylether, dibutylether, diethylene glycol diethyl ether, diethylene glycol dimethyl ether, diethoxyethane, tetrahydrofuran and the like.

The volatile constituents may be removed in vacuum at a temperature of from about 25° C. up to about 175° C. and more preferably at a temperature of from about 80° C. to about 150° C.

The molar ratio of the acrylate-containing silane to cyclic trisiloxane is from about 0.00015 to 3 and more preferably from about 0.001 to 1.

The acrylate-functional organopolysiloxanes prepared in accordance with the above methods are preferably fluids having viscosities of from 50 to 1,000,000 mPa.s and more preferably from 100 to 100,000 mPa.s at 25° C.

When the compositions are to be cured by exposure to non-ionizing radiation, such as ultraviolet light, then it is preferred that a photosensitizer be incorporated in the acrylate-functional organopolysiloxane compositions of this invention.

Photosensitizers which may be employed are benzophenone, xanthone, thioxanthone, 2-chlorothioxanthone, benzoin isopropyl ether, benzoquinone, 1-chloroanthraquinone, p-diacetylbenzene, 9,10-dichloroanthracene, 4,4-dichlorobenzophenone, 1,3-diphenyl-2-propane, 1,4-naphthyl-phenyl ketone, 2,3-pentanedione, mixtures of benzophenone and tertiary amines, such as N,N-dimethylethanolamine and diazo compounds which dissociate into free radicals, such as N,N-azo-bisisobutyronitrile.

The photosensitizers are generally used in an amount up to about 20 weight percent, based on the weight of the acrylate-functional organopolysiloxanes. Preferably, the photosensitizer is present in an amount of from about 0.5 to about 5 weight percent, based on the weight of the acrylate-functional organopolysiloxanes.

The compositions of this invention may be thermally polymerized by adding an organic peroxide, in an amount of from about 0.1 to 10 weight percent based on the weight of the acrylate-functional organopolysiloxanes.

The compositions of this invention may also be polymerized by ultraviolet radiation by adding a photosensitizer and an organic peroxide. The amount of organic peroxide may range from about 0.1 to 10 weight percent based on the weight of the acrylate-functional organopolysiloxanes.

Examples of suitable organic peroxides are benzoyl peroxide, dibenzoyl peroxide, di-t-butyl peroxide, t-butylbenzoyl peroxide, cumene hydroperoxide, dicumyl peroxide, lauroyl peroxide, $\alpha, \alpha'$-bis(t-butylperoxy) diisopropylbenzene, 2,5-bis(t-butylperoxy)-2,5-dimethylhexane and t-butyl perbenzoate.

In addition to the aforementioned components, the compositions of this invention may also contain other additives such as diluents, flow control agents, levelling agents, inhibitors, pigments and the like.

Oftentimes, it may be desirable to add a diluent to the compositions of this invention in order to aid in their applications to a substrate. If an inert organic solvent is employed, it must be evaporated from the coating; therefore, it is preferred that a radiation reactive diluent be used, such as an acrylate ester (or, less desirably, a methacrylate ester). Examples of reactive diluents are ethyl acrylate, n-amyl acrylate, benzyl acrylate, cyclohexyl acrylate, 2-(N-methylcarbamoyloxy)ethyl acrylate, diethylaminoethyl acrylate, 2-ethoxyethyl acrylate, n-lauryl acrylate, n-octyl acrylate, octadecyl acrylate, the corresponding methacrylates and/or the polyacrylate compounds described heretofore. If desired, a low-viscosity siloxane fluid having a single acrylate or methacrylate group bonded thereto may be employed as a diluent. The diluent can be employed at a concentration of from 0.001 to about 30 weight percent based on the total weight of the radiation curable composition.

The radiation polymerizable compositions of this invention may be stabilized against premature polymerization during storage by the addition of a conventional polymerization inhibitor such as hydroquinone, monomethyl ether of hydroquinone, phenothiazine and di-tert-butyl para-cresol in concentrations on the order of about 0.1 weight percent or less based on the weight of the radiation curable composition.

The radiation polymerizable compositions are preferably prepared by mixing the aforementioned components at room temperature; however, mild heating may be employed in some instances to facilitate mixing.

The radiation polymerizable compositions are applied to a substrate as a coating by any conventional means known in the coating art such as reverse roll coating, coating with the aid of a doctor blade, brushing, spraying or dipping the substrate in the coating composition. While paper will undoubtedly be one of the most commonly employed substrates, the compositions of this invention can be suitably applied to any substrate. For example, the compositions can be employed to form release coatings or protective coatings on substrates as diverse as glass, steel, aluminum, polyester, woven glass fibers, non-woven glass fibers and non-woven fabrics, optic fibers, conformal coatings for electronic circuit boards, photoresist coatings, and as coupling agents and as paper coatings.

While it is preferred to premix the components of the radiation polymerizable composition prior to application on the substrate, it is also possible to form the composition on the substrate by individual application of the components thereto, such as by simultaneously spraying the individual components onto the substrate surface.

The amount of radiation polymerizable composition applied to the substrate varies, depending on the properties desired in the release coating, the radiation source used, the particular formulation used, etc. Theoretically, there is no lower limit to the applied coating weight, provided the substrate surface is covered, however, practical limitations will be imposed by the particular coating method used. For economic reasons it is normally desired to use the lowest possible applied coating weight. For purposes of producing a paper release coating which is useful as a protective covering for a pressure sensitive adhesive tape, it has been found that coating weights of from about 0.6 to 2.6 g per square meter of coated substrate are quite satisfactory.

The radiation polymerizable composition which has been applied to the substrate can be polymerized by exposure to known forms of ionizing or actinic non-ionizing radiation. Suitable forms of radiation include ultraviolet light, electron beam, x-ray, gamma-ray, beta-ray, etc. The equipment for generating these forms of energy is known in the art. It is preferred that ultraviolet light be employed due to the simplicity and availability of the equipment for generating ultraviolet light and the relatively low amounts of energy consumed by such equipment.

Polymerization may be carried out in an air atmosphere or in an inert atmosphere such as argon or nitrogen. The time required to polymerize the coating varies with such factors as the particular composition used, type and wavelength of radiation, energy flux, concentration of photosensitizer and thickness of the coating; however, it is generally quite short, that is, less than about 10 seconds.

Specific embodiments of this invention are further illustrated in the following examples in which all parts are by weight unless otherwise specified.

Preparation of Aminofunctional Organopolysiloxane

A mixture containing 16.2 parts of hexamethyldisiloxane, 444.0 parts of octamethylcyclotetrasiloxane, 13.1 parts of a hydrolyzate of N-methyl-3-aminopropylmethyldimethoxysilane, and 0.5 parts of potassium hydroxide is heated at 160° C. for 6 hours and then cooled to 100° C. About 0.5 parts of acetic acid are added and the product is then vacuum stripped at 100° C. at less than 1 torr. The resultant product is filtered and devolatilized for 1 hour at 150° C. A fluid product is obtained having a mole ratio of

groups of 60:1 and having a base content of 0.21 milliequivalen per gram of fluid which indicates there are 0.21 milliequivalents of the group having the unit formula

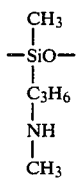

EXAMPLE 1

(A) To a flask containing 4 parts of hexanediol diacrylate is added 95.4 parts of the trimethylsiloxy-endblocked aminofunctional dimethylpolysiloxane fluid prepared above and 0.05 parts of para-methoxyphenol. The reactants are mixed for one hour at 25° C. then a sample is withdrawn and analyzed. Nuclear Magnetic Resonance analysis shows the following mole ratios of groups to be present.

| Group(s) | Chemical Shift PPM | Found | Theory |
|---|---|---|---|
| $CH_2(CH_2N$ and $CH_2\overset{O}{\underset{\|}{C}})$ | 2.8 | 0.4 | 0.5 |
| $CH_2=CH$ | 7.5–6.3 | 0.7 | 0.5 |
| $CH_2O\overset{O}{\underset{\|}{C}}$ | 4.1 | 1.0 | 1.0 |
| $OSi(CH_3)_2$ | 0.2 | 31.5 | 30 |

The ratios indicate that about ninety percent of the amine reacted with the acrylate.

(B) To 5 parts of the acrylate-functional polysiloxane prepared in (A) above is added 0.15 parts of 1-hydroxycyclohexylphenyl ketone (available as Irgacure ® 184 from Ciba-Geigy Corporation). The mixture is heated to 60° C. and then cooled to about 25° C.

A thin film is applied to paper and the coated paper passed under two ultraviolet lamps, each of which provides 180 watts per square inch at 100 feet per minute. A smear resistant film is obtained after one pass.

An adhesive label is first applied to the cured film and then applied to a clean glass surface. The label showed excellent adhesion to the glass surface.

EXAMPLE 2

(A) To a flask containing 100 parts of hexanediol diacrylate is added 49 parts of 3-aminopropyltriethoxysilane dropwise over a period of 45 minutes at room temperature. During the addition of the 3-aminopropyltriethoxysilane, the temperature of the reaction mixture increases about 7° C. The product is cooled to about 25° C. and mixed for about two hours. Nuclear Magnetic Resonance analysis of the reaction product shows the following groups to be present.

| Group(s) | Chemical Shift PPM | Mole Ratio | Theory |
|---|---|---|---|
| $CH_2=CH\overset{O}{\underset{\|}{C}}$ | 7.5–6.3 | 1.7 | 2.0 |
| $CH_2Si$ | 0.8 | 1.0 | 1.0 |

(B) To a flask containing 100 parts of the product prepared in Example 2(A) above is added 98.9 parts of hexamethylcyclotrisiloxane, 0.2 parts of lithium hydroxide and 0.05 parts of paramethoxyphenol. The mixture is heated at a temperature of from 95° to 100° C. for two hours and the resultant product is cooled to room temperature. About 0.5 parts of acetic acid is added and the resultant product is mixed for one hour. The mixture is then filtered and the filtrate heated up to 98° C. at less than 1 torr to remove the volatiles. Analysis of the resultant product by Nuclear Magnetic Resonance shows the following groups to be present.

| Group(s) | Chemical Shift PPM | Mole Ratio |
|---|---|---|
| $OSi(CH_3)_2$ | 0.3 | 3.05 |
| $SiCH_2$ | 0.9 | 1.0 |
| $CH_2=CH\overset{O}{\underset{\|}{C}}$ | 6.3–7.5 | 1.6 |

The resultant product is identified as being an acrylate-functional polysiloxane which has a viscosity of about 350 mPa.s at 25° C. and after storing for two months, the viscosity is essentially unchanged.

(C) To 5 parts of the acrylate-functional polysiloxane prepared in Example 2(B) above, is added 0.15 parts of 1-hydroxycyclohexylphenyl ketone (available as Irgacure ® 184 from Ciba-Geigy Corporation) and heated to 60° C. After cooling to room temperature, a thin film is applied to paper, glass and a Mylar sheet. Each coated substrate is then passed under two ultraviolet lamps, each of which provides 180 watts per square inch at 100 feet per minute. A cured film is obtained after one pass under the ultraviolet lamps.

EXAMPLE 3

(A) A flask containing 747.3 parts of 3-aminopropyltriethoxysilane, 751.4 parts of octamethylcyclotetrasiloxane and 1.5 parts of potassium hydroxide is heated to a temperature of 150° C. for 3 hours. The resultant product is cooled to 95° C. and 1.5 parts of glacial acetic acid are added. The resultant product is then cooled to room temperature and filtered. The filtrate is then devolatilized up to 150° C. for 1 hour and at 1 torr. The resultant aminofunctional polysiloxane has a viscosity of 12.8 mPa.s at 25° C. and a base content of 3.03 milliequivalents per gram. Nuclear Magnetic Resonance analysis shows a ratio of $C_2H_5O:CH_2N:OSi(CH_3)_2$ groups of 1.78:1:2.3.

(B) To a flask containing 184.8 parts of trimethylolpropane triacrylate and 0.06 parts of para-methoxyphenol is slowly added 115.2 parts of the aminofunctional polysiloxane prepared in Example 3(A) above and then mixed for 6.5 hours at room temperature. A product having a viscosity of 385 mPa.s at 25° C. is obtained. Nuclear Magnetic Resonance analysis shows a ratio of

groups of 1.1:1.0, whereas the theoretical ratio is 1:1.

To 5 parts of the above acrylate functional fluid is added 0.15 parts of 1-hydroxycyclohexylphenyl ketone (available as Irgacure ® 184 from Ciba Geigy Corporation) and heated to 60° C. After cooling to room temperature, a thin film is applied to a paper substrate and the paper passed under two ultraviolet lamps, each of which provides 180 watts per square inch at 100 feet per minute. A cured film is obtained which is resistant to smearing.

EXAMPLE 4

(A) To a flask containing 68.4 parts of a silanol-terminated dimethylpolysiloxane having 2.1 weight percent of OH groups is added 40 parts of N-methyl-3-aminopropyltrimethoxysilane and 25 parts of toluene. The resultant solution is refluxed until about 9.1 parts of a toluene-methanol azeotropic mixture is collected containing about 41 percent methanol. The reaction product is then devolatilized up to 150° C. at less than 1 torr. A fluid product having a base content of 1.04 milliequivalents per gram is obtained. Nuclear Magnetic Resonance analysis shows a ratio of $(CH_3)_2SiO:OCH_3:CH_3NHCH_2$ groups of 10.9:2.2:1.0, whereas the theoretical ratio is 10.8:2.0:1.0.

(B) To a flask containing 5.9 parts trimethyolpropane triacrylate is slowly added 19.1 parts of the aminofunctional fluid prepared in Example 4(A) above and mixed for about 6 hours. Nuclear Magnetic Resonance analysis of the resultant product shows a ratio of

of 1:6.4, whereas the theoretical ratio is 1:5.5. The product gelled after storage for three weeks in a closed container.

EXAMPLE 5

(A) To a flask containing 100 parts of hexanediol diacrylate is added dropwise 44.2 parts of 3-aminopropyltriethoxysilane. After the addition is complete, 133.2 parts of a silanol-terminated dimethylpolysiloxane having 2.5 weight percent of OH groups and 0.14 parts of lithium hydroxide are added and the resultant mixture is heated to 175° C. and at 1 torr. The product is then cooled to room temperature and filtered. A fluid having a viscosity of about 800 mPa.s at 25° C. is obtained. Nuclear Magnetic Resonance analysis of the resultant product shows a ratio of

of 1:2.4; whereas the theoretical ratio is 1:2.25.

(B) To 5 parts of the acrylate-functional polysiloxane prepared in Example 5(A) above is added 0.15 parts of 1-hydroxycyclohexylphenyl ketone (available as Irgacure ® 184 from Ciba Geigy Corporation), then heated to 60° C. and cooled to room temperature. After applying a thin film to a paper substrate, the coated paper is passed under two ultraviolet lamps, each of which provides 180 watts per square inch at 100 feet per minute.

A smear resistant film is obtained after one pass. An adhesive label is applied to the cured film, removed and then applied to a glass substrate. The adhesive label is easily removed from the coated paper; however, it showed excellent adhesion to the glass substrate.

EXAMPLE 6

(A) To a flask is added 56.7 parts of a silanol-terminated dimethylpolysiloxane having 2.1 weight percent of OH groups, 31.1 parts of aminopropyltriethoxysilane and 12.2 parts of toluene. The resulting mixture is refluxed until 9.3 parts of an azeotropic mixture consisting of ethanol and toluene is distilled off. The reaction product is then devolatilized at 110° C. and at less than 1 torr. The product has a base content of 0.95 milliequivalents per gram and a viscosity of about 45 mPa.s at 25° C. Nuclear Magnetic Resonance analysis of the product shows a ratio of $OSi(CH_3)_2:CH_2N:OC_2H_5$ groups of 10.6:1:1.85, whereas the theoretical ratio is 10.8:1:2.

(B) To a flask containing 50.0 parts of the aminofunctional dimethylpolysiloxane prepared in Example 6(A) above is added 0.01 part of para-methoxyphenol with agitation. About 4.4 parts of isobornyl acrylate is then added dropwise to the mixture. After the addition of the acrylate is complete, the mixture is heated for 3 hours at 80°±5° C. About 30.0 parts of xylene are added to the mixture and heated for 3 hours at 95°±5° C. and then cooled to room temperature. After a period of 72 hours, the mixture is then devolatized at 120° C. and at less than 1 torr. The product has a base content of 0.29 milliequivalents per gram. Nuclear Magnetic Resonance analysis of the resultant product indicated that all the isobornyl acrylate has reacted.

(C) When about 1 part of trimethylolpropane triacrylate is mixed with about 5.7 parts of the product prepared in Example 6(B) above, it forms a solid resinous material within 48 hours.

EXAMPLE 7

(A) To a flask containing 25 parts of aminopropyltrimethoxysilane is added 29 parts of isobornyl acrylate at room temperature and with agitation. An exotherm of about 10° C. is observed. The product has a base equivalent of 2.4 milliequivalents per gram and Nuclear Magnetic Resonance analysis indicates that all the isobornyl acrylate has reacted.

(B) To a flask equipped with a stirrer, distillation column and Claisen head is added 54 parts of the product prepared in Example 7(A) above, 123.4 parts of a silanol-terminated dimethylpolysiloxane having 1.94 weight percent of OH groups and 37.0 parts of toluene. The reactants are heated until the Claisen head temperature is 105° C. Gas chromatographic analysis of the volatiles indicates that the volatiles contain 49 weight percent of methanol and 51 weight percent of toluene. The reaction product is devolatized at 120° C. at less than 1 torr for 3 hours. An additional 37 parts of volatiles are collected of which 4 weight percent is methanol and 96 weight percent is toluene as determined by gas chromatographic analysis. Nuclear Magnetic Resonance analysis of the product indicates a ratio of

of 23.7:2.0:4.1:6.3. The base equivalent of the product is 0.76 milliequivalents per gram and the viscosity is 129.4 mPa.s at 25° C.

(C) About 10.0 parts of the product prepared in Example 7(B) above is mixed with 2.3 parts of trimethylolpropane triacrylate at room temperature. Nuclear Magnetic Resonance analysis shows a ratio of

of 23.7:3.0:5.0:3.9:8.4. A film is applied to a paper substrate and cured in accordance with the procedure of Example 1(B). A smear resistant film is obtained after one pass under the ultraviolet lamps.

EXAMPLE 8

(A) To a flask containing 100.0 parts of the product prepared in Example 7(A) is added 172.1 parts of hexamethylcyclotrisiloxane and 0.3 parts of lithium hydroxide catalyst. The reactants are heated at 100° C. for 1 hour, then cooled to room temperature. About 0.4 parts of acetic acid are added to neutralize the catalyst and the product is devolatized at 100° C. at less than 1 torr and then filtered. Nuclear Magnetic Resonance analysis indicates a ratio of

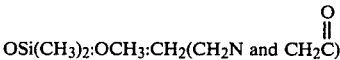

of 7.52:2.51:3. The product has a viscosity of 32.9 mPa.s at 25° C. and a base equivalent of 0.95 milliequivalents per gram.

(B) About 5.0 parts of the product prepared in Example 8(A) above are mixed with 2.8 parts of trimethylolpropane triacrylate and 0.03 parts of para-methoxyphenol at room temperature. Nuclear Magnetic Resonance analysis indicates a ratio of

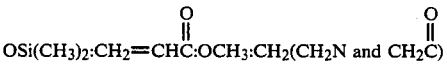

of 7.52:1.53:2.31:3.57. A thin film is applied to a paper substrate and cured in accordance with the procedure of Example 1(B). The resulting film is completly cured after one pass under the ultraviolet lights.

EXAMPLE 9

(A) A flask containing 249.4 parts of aminopropyltriethoxysilane and 748.2 parts of hexamethylcyclotrisiloxane is heated to 100° C. with agitation. About 1 part of lithium hydroxide is added and the reactants cooled to 59° C. The catalyst is neutralized with 1.4 parts of acetic acid and the reaction product devolatized at 100° C. at less than 1 torr. The viscosity of the resultant product is 11.5 mPa.s at 25° C. and the base equivalent is 1.58 milliequivalents per gram. Nuclear Magnetic Resonance analysis indicates a ratio of $OSi(CH_3)_2:OCH_2:CH_2N$ of 5.56:2.89:1.

(B) To a flask containing 37 parts of polyethylene glycol diacrylate (available as SR-344 from Sartomer Company), 62.7 parts of anhydrous isopropyl alcohol, 0.12 parts of para-methoxyphenol and 0.01 part of antioxidant (available as Santoflex ® 134 from Monsanto Industrial Chemicals Co.) is added 22.3 parts of the aminofunctional dimethylpolysiloxane fluid prepared in Example 9(A) above with agitation. The reactants are heated at 40°–45° C. for 2 hours then devolatized at 40°–45° C. at less than 1 torr. Nuclear Magnetic Resonance analysis indicates a ratio of

of 5.56:1.73:38.0:5.14 and a viscosity of 718.4 mPa.s at 25° C. A thin film is applied to a paper substrate and cured in accordance with the procedure of Example 1(B). The resulting cured film is of a wax consistency.

EXAMPLE 10

To a flask containing 29.6 parts of trimethylolpropane triacrylate, 30.0 parts of tripropylene glycol diacrylate and 0.14 parts of para-methoxyphenol is added 81.3 parts of the aminofunctional dimethylpolysiloxane fluid prepared in accordance with the procedure of Example 9(A) above, having a base equivalent of 1.23 milliequivalents per gram. The reactants are heated at 50° C. for 4 hours. The resultant product has a viscosity of 74.7 mPa.s at 25° C. and Nuclear Magnetic Resonance analysis of the product indicates a ratio of

of 7.19:3.12:10.17:4.15. A thin film is applied to a paper substrate and cured in accordance with the procedure of Example 1(B). The resulting cured film is smear resistant.

EXAMPLE 11

(A) To a flask containing 16.2 parts polyethylene glycol diacrylate (available as SR-344 from Sartomer Company), 62.0 parts of anhydrous isopropyl alcohol and 0.04 parts of paramethoxyphenol is added 50.0 parts of the aminofunctional dimethylpolysiloxane fluid prepared in accordance with the procedure of Example 9(A) above, having a base equivalent of 1.23 milliequivalents per gram. The reactants are heated at reflux (67° C.) for 5 hours and then devolatized at 100° C. at less than 1 torr. Nuclear Magnetic Resonance analysis of the product indicates a ratio of

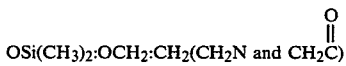

of 8:11.2:2.94.

(B) About 10 parts of the product prepared in Example 11(A) above are mixed at room tmeperature with 4.0 parts of glycerylpropoxytriacrylate (available from Celanese Chemical Co.). A thin film is applied to paper and the resultant film cured in accordance with the procedure described in Example 1(B). The film is completely cured after one pass.

EXAMPLE 12

To a flask containing 25.0 parts of acrylate-functional silane prepared in Example 2(A) is added 123.6 parts of hexamethylcyclotrisiloxane, 7.5 parts of ethylene glycol dimethyl ether, 0.03 parts of para-methoxyphenol and 0.05 parts of lithium hydroxide. The reactants are heated at 100° C. for 2.75 hours, then cooled to room temperature and then 0.07 parts of acetic acid are added. The product is devolatized at 100° C. at less than 1 torr, then cooled to room temperature and filtered. Nuclear Magnetic Resonance analysis of the resultant product indicates a ratio of

of 31.2:2.0:6.4:3.6. The viscosity of the product is 210 mPa.s at 25° C. A thin film is applied to a paper substrate and cured in accordance with the procedure of Example 1(B). The cured film has an oily surface which readily smears.

EXAMPLE 13

(A) To a flask equipped with a stirrer is added 218.8 parts of 1,6-hexanediol diacrylate and 0.02 parts of methylethylhydroquinone. The mixture is agitated until the methylethylhydroquinone is completly dissolved and then 107.2 parts of aminopropyltriethoxysilane is added through an addition funnel. The reactants are stirred for about 1 hour at room temperature. Nuclear Magnetic Resonance analysis indicates that the resulting product has a ratio of $$\text{SiCH}_2\text{:CH}_2=\text{CHC:OCH}_3\text{:CH}_2(\text{CH}_2\text{N and CH}_2\overset{\text{O}}{\overset{\|}{\text{C}}})$$

of 1:2.63:7.2:4, whereas the theoretical ratio is 1:2:7:5. The product is applied as a thin film to a paper substrate and cured in accordance with the procedure described in Example 1(B). A slightly "plastic-like" film is obtained.

(B) About 25.0 parts of the acrylate-functional aminosilane prepared in Example 13(A) above, 123.6 parts of hexamethylcyclotrisiloxane, 7.5 parts of ethylene glycol dimethyl ether, 0.03 parts of methylethylhydroquinone, and 0.05 parts of lithium hydroxide are added to a flask with agitation and heated at 97°±3° C. for 2.75 hours. The resultant product is cooled to room temperature and neutralized with 0.12 parts of acetic acid. The product is devolatilized at a temperature up to 98° C. at less than 1 torr, cooled to room temperature and filtered. The viscosity of the devolatilized product is 210 mPa.s at 25° C. Nuclear Magnetic Resonance analysis indicates that the product has a ratio of

of 31.2:2:6.4:3.6. When the product is applied as a thin film to a paper substrate and cured in accordance with the procedure described in Example 7(C), an oily film is obtained.

EXAMPLE 14

(A) A flask containing 110 parts of 3-aminopropyltriethoxysilane and 147 parts of trimethylolpropane triacrylate is mixed six hours at room temperature and then 86 parts of isopropyl alcohol and 18 parts of water are added. The resultant solution is then added to a flask containing 777 parts of hexamethylcyclotrisiloxane and 6 parts of lithium hydroxide. The resultant mixture is heated at 80° C. for one hour, cooled to room temperature, filtered and vacuum stripped at less than 10 torr at 100° C. Nuclear Magnetic Resonance analysis indicates that the product contains 3.5 dimethylsiloxy groups per 4 acrylate groups.

(B) To about five parts of the above product is added 0.15 parts of a mixture consisting of 0.075 parts of benzophenone and 0.075 parts of 1-hydroxycyclohexylphenyl ketone. The resultant solution is applied to a paper substrate and then passed under two ultraviolet lamps, each of which provides 180 watts per inch at 100 ft per minute. A clear, abrasion-resistant film is obtained.

EXAMPLE 15

(A) To a flask equipped with an agitator and an 18 inch packed insulated distillation column is added 655 parts of gamma-aminopropyltriethoxysilane, 2513 parts of hydroxyl-terminated polydimethylsiloxane and 432 parts of toluene and then heated to reflux temperature. The reactants are refluxed until an azeotrope containing 74 parts of ethanol is recovered. The reactants are devolatized at 150° C. for 2 hours to yield a product having a base equivalent of 0.6 milliequivalents per gram and a viscosity of 94 mPa.s at 25° C. Nuclear Magnetic Resonance analysis indicates a ratio of OSi(CH$_3$)$_2$:OC$_2$H$_5$:CH$_2$N groups of 45.7:4.5:2.5.

(B) To a flask equipped with agitator and a reflux condenser is added 700 parts of the product prepared in (A) above, 356.2 parts of xylene and 0.5 parts of isobornyl acrylate and then heated to a temperature of from 90° to 100° C. for 26 hours. The reactants are devolatized at 120° C. for 2 hours, resulting in a product having a base equivalent of 0.5 milliequivalents per gram and a viscosity of 183 mPa.s at 25° C. Nuclear Magnetic Resonance analysis indicates a ratio of

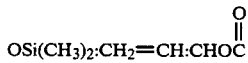

groups of 45.7:1.0:2.8.

(C) About 100 parts of the product prepared in (B) above are mixed with 34.8 parts of trimethylolpropane triacrylate and 0.07 parts of para-methoxyphenol and then placed in a 50° C. oven for 18 hours. The viscosity of the resultant product is 839 mPa.s at 25° C. Nuclear Magnetic Resonance analysis indicates a ratio of

of 45.7:14.7:1.0:19.0:26.7.

A thin film is prepared and irradiated in accordance with Example 1.

The cured film is measured for completeness of cure by applying a strip of Scotch tape to the cured film, removing the Scotch tape and then the adhesive side of the scotch tape is mated and then separated.

The procedure is repeated with another strip of Scotch tape, except the tape was not applied to the cured film.

About the same amount of force is required to separate the pieces of tape indicating that the film is completely cured.

(D) About 100 parts of the product prepared in (B) above are mixed with 14.8 parts of trimethylolpropane triacrylate and 0.06 parts of para-methoxyphenol and placed in a 50° C. oven for about 18 hours. The viscosity of the resultant product is 597 mPa.s at 25° C. Nuclear Magnetic Resonance analysis indicates a ratio of

groups of 45.7:6.6:2.0:10.5:8.9.

A thin film is prepared and irradiated in accordance with the procedure described in Example 1.

The completeness of cure of the film is again measured using the Scotch tape test. The strip of scotch tape applied to the film lost some of its adhesive characteristics indicating that some of the film adhered to the adhesive surface of the tape. This indicates that the film is incompletely cured.

EXAMPLE 16

The procedure of Example 1(A) is repeated, except that 2.9 parts of N,N'-methylenebisacrylamide is substituted for the hexanediol diacrylate. When 0.15 parts of 1-hydroxycyclohexylphenyl ketone is added to 5 parts of the resultant composition and applied to a substrate, it cures to a smear resistant film when exposed to ultraviolet light.

EXAMPLE 17

The procedure of Example 1(A) is repeated, except that 4.1 parts of 2,2'-thiodiethanol diacrylate is substituted for the hexanediol diacrylate. When 0.15 parts of 1-hydroxycyclohexylphenyl ketone is added to 5 parts of the resultant composition and applied to a substrate, it cures to a smear resistant film when exposed to ultraviolet light.

What is claimed is:

1. A polymerizable acrylate-functional organopolysiloxane composition comprising an organopolysiloxane of the formula

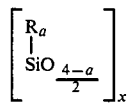

where R is selected from the group consisting of a monovalent hydrocarbon radical, a substituted monovalent hydrocarbon radical having from 1 to 20 carbon atoms, a monovalent hydrocarbonoxy radical having from 1 to 20 carbon atoms and a radical of the formula

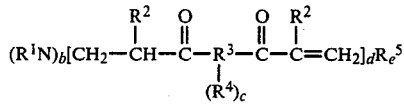

where at least one R is a radical having the above formula, $R^1$ is a divalent radical selected from the group consisting of a saturated divalent hydrocarbon radical having from 1 to 20 carbon atoms, a divalent hydrocarbonoxy radical in which the oxygen is in the form of an ether linkage and an unsaturated divalent hydrocarbon radical having from 2 to 20 carbon atoms; $R^2$ is selected from the group consisting of hydrogen, a methyl radical and mixtures thereof, $R^3$ is a radical having 2, 3, 4, 5 or 6 valences in which the radical is selected from the group consisting of a substituted hydrocarbon radical, a hydrocarbon ether radical, a thioether radical and the terminal atoms of the $R^3$ radical are selected from the group consisting of oxygen and nitrogen; $R^4$ is a radical linked to the terminal oxygen or nitrogen atoms of $R^3$ and is selected from the group consisting of a monovalent hydrocarbon radical having from 1 to 20 carbon atoms, an acryloyl radical and a substituted acryloyl radical and when the terminal atom of $R^3$ is oxygen, then $R^4$ may be hydrogen; $R^5$ is selected from the group consisting of a monovalent hydrocarbon radical having from 1 to 20 carbon atoms and a radical of the formula

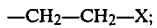

X is selected from the group consisting of —$COOR^6$, —$CONR^6$, —CN and —$SO_2R^6$; $R^6$ is a monovalent hydrocarbon radical having from 1 to 20 carbon atoms, a is a number having an average value of 0.7 to 2.6, b is a number of from 1 to 3, c is a number of from 0 to 4, d is a number of from 1 to 4, e is a number of from 0 to 4, x is a number of from 2 to 20,000 with the proviso that $b+1=d+e$.

2. The composition of claim 1, wherein the $R^3$ radical is a substituted hydrocarbon radical having terminal oxygen atoms.

3. The composition of claim 1, wherein the $R^3$ radical provides sites for linking up to four additional acryloyl radicals.

4. The composition of claim 1, wherein the composition contains a photosensitizer.

5. The composition of claim 1, wherein the composition contains an organic peroxide.

6. The composition of claim 4, wherein the composition contains an organic peroxide.

7. The composition of claim 4, wherein the photosensitizer is present in an amount of from about 0.5 to about 20 percent by weight based on the weight of the acrylate-functional organopolysiloxane.

8. The composition of claim 5, wherein the organic peroxide is present in an amount of from about 0.1 to 10 percent by weight based on the weight of the acrylate-functional organopolysiloxane.

9. The composition of claim 1, wherein $R^1$ is a divalent hydrocarbon radical having from 1 to 20 carbon atoms.

10. The composition of claim 1, wherein $R^1$ is an unsaturated divalent hydrocarbon radical having from 2 to 20 carbon atoms.

11. The composition of claim 1, wherein $R^1$ is a divalent hydrocarbonoxy radical of the formula $$(CH_2)_d(OC_gH_{2g})_k,$$

where d is a number of from 1 to 4, g is 2, 3 or 4, k is at least 1 and the sum of d+k is a number such that the hydrocarbonoxy radical has from 3 to 20 carbon atoms.

12. The composition of claim 1, wherein the terminal atoms of $R^3$ are oxygen and $R^4$ is hydrogen.

13. The composition of claim 1, wherein $R^4$ is a monovalent hydrocarbon radical having from 1 to 20 carbon atoms.

14. The composition of claim 1, wherein $R^4$ is an acryloyl radical.

15. The composition of claim 1, wherein $R^5$ is a monovalent hydrocarbon radical having from 1 to 20 carbon atoms.

16. The composition of claim 1, wherein $R^5$ is a radical of the formula $$-CH_2-CH_2-X;$$

X is selected from the group consisting of —$COOR^6$, —$CONR^6$, —CN and $SO_2R^6$ and $R^6$ is a monovalent hydrocarbon radical having from 1 to 20 carbon atoms.

17. The composition of claim 1, wherein $R^2$ is hydrogen.

18. The composition of claim 4, wherein $R^2$ is hydrogen.

19. The composition of claim 5, wherein $R^2$ is hydrogen.

20. The composition of claim 6, wherein $R^2$ is hydrogen.

21. The composition of claim 1, wherein $R^5$ is a radical of the formula $$-CH_2-CH_2\overset{\overset{\displaystyle O}{\|}}{C}-O-R^6,$$

where $R^6$ is a monovalent hydrocarbon radical having from 1 to 20 carbon atoms.

22. The composition of claim 17, wherein $R^5$ is a radical of the formula $$-CH_2-CH_2\overset{\overset{\displaystyle O}{\|}}{C}-O-R^6,$$

where $R^6$ is a monovalent hydrocarbon radical having from 1 to 20 carbon atoms.

23. The composition of claim 18, wherein $R^5$ is a radical of the formula $$-CH_2-CH_2\overset{\overset{\displaystyle O}{\|}}{C}-O-R^6,$$

where $R^6$ is a monovalent hydrocarbon radical having from 1 to 20 carbon atoms.

24. The composition of claim 19, wherein $R^5$ is a radical of the formula $$-CH_2-CH_2\overset{\overset{\displaystyle O}{\|}}{C}-O-R^6,$$

where $R^6$ is a monovalent hydrocarbon radical having from 1 to 20 carbon atoms.

25. The composition of claim 20, wherein $R^5$ is a radical of the formula $$-CH_2-CH_2\overset{\overset{\displaystyle O}{\|}}{C}-O-R^6,$$

where $R^6$ is a monovalent hydrocarbon radical having from 1 to 20 carbon atoms.

26. A method for preparing a polymerizable acrylate functional organopolysiloxane composition which comprises reacting an aminofunctional organopolysiloxane having at least one unit of the formula $$R_e^5H_n(NR^1)_bSiO_{\frac{3-m}{2}}^{R_m^{10}}$$

where $R^1$ is a divalent radical selected from the group consisting of a saturated divalent hydrocarbon radical having from 1 to 20 carbon atoms, a divalent hydrocarbonoxy radical in which the oxygen is in the form of an ether linkage and an unsaturated divalent hydrocarbon radical having from 2 to 20 carbon atoms; $R^5$ is selected from the group consisting of a monovalent hydrocarbon radical having from 1 to 20 carbon atoms and a radical of the formula $$-CH_2-CH_2-X;$$

X is selected from the group consisting of —$COOR^6$, —$CONR^6$, —CN and —$SO_2R^6$; $R^6$ is a monovalent hydrocarbon radical having from 1 to 20 carbon atoms, $R^{10}$ is a monovalent hydrocarbon radical having from 1 to 20 carbon atoms, b is a number of from 1 to 3, e is a number of from 0 to 4, m is 0, 1 or 2 and n is a number of from 1 to 5, with the proviso that $n=b-e+1$ with a polyacrylate containing compound.

27. The method of claim 26, wherein the reaction is conducted at a temperature of from 25° to 150° C.

28. The method of claim 26, wherein the reaction is conducted in the presence of a hydrocarbon solvent.

29. The method of claim 26, wherein the molar ratio of the polyacrylate containing compound to the amine groups of the aminofunctional organopolysiloxane is from 0.75 to 10.

30. The method of claim 26, wherein the aminofunctional organopolysiloxane is obtained from the reaction of an aminofunctional silane having at least one hydrocarbonoxy group linked to a silicon atom with an organopolysiloxane selected from the group consisting of an organopolysiloxane having at least one hydroxyl group linked to a silicon atom and a cyclic trisiloxane.

31. A method for preparing a polymerizable acrylate-functional organopolysiloxane composition which comprises reacting an acrylate-functional aminosilane having at least one hydrocarbonoxy group linked to a silicon atom with an organopolysiloxane selected from the group consisting of an organopolysiloxane having at least one hydroxyl group linked to a silicon atom and a cyclic trisiloxane.

32. The method of claim 31, wherein the acrylate-functional aminosilane is reacted with an organopolysiloxane having at least one hydroxyl group linked to the silicon atom of the organopolysiloxane in the presence of a catalyst which promotes the reaction of the hydrocarbonoxy group with the hydroxyl group.

33. The method of claim 31, wherein the hydroxyl-containing organopolysiloxane is represented by the formula

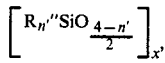

where R'' is selected from the group consisting of a monovalent hydrocarbon radical having from 1 to 20 carbon atoms and hydroxyl radicals, in which at least one R'' per molecule is a hydroxyl radical, n' has an average value of from 1.8 to 2.2 and x is a number of from 2 to 20,000.

34. The method of claim 31, wherein the molar ratio of acrylate-functional aminosilane to hydroxyl-containing organopolysiloxane may range from about 0.5 to 6 moles of acrylate-functional aminosilane per mole of hydroxyl containing organopolysiloxane.

35. The method of claim 31, wherein the reaction is conducted at a temperature of from 25° to 175° C.

36. The method of claim 31, wherein the reaction is conducted in the presence of an inert solvent.

37. The method of claim 32, wherein the catalyst is an organic amine.

38. The method of claim 32, wherein the catalyst is a lithium compound.

39. The method of claim 33, wherein the hydroxyl-containing organopolysiloxane has a viscosity of from about 25 to about 500,000 mPa.s at 25° C.

40. The method of claim 31, wherein the acrylate-functional aminosilane is obtained from the reaction of an aminofunctional silane and a polyacrylate containing compound.

41. The method of claim 40, wherein the aminofunctional silane is represented by the formula

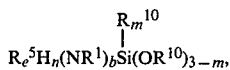

wherein $R^1$ is a divalent radical selected from the group consisting of a saturated divalent hydrocarbon radical having from 1 to 20 carbon atoms, a divalent hydrocarbonoxy radical in which the oxygen is in the form of an ether linkage and an unsaturated divalent hydrocarbon radical having from 2 to 20 carbon atoms; $R^5$ is selected from the group consisting of a monovalent hydrocarbon radical having from 1 to 20 carbon atoms and a radical of the formula

X is selected from the group consisting of $—COOR^6$, $—CONR^6$, $—CN$ and $—SO_2R^6$; $R^6$ is a monovalent hydrocarbon radical having from 1 to 20 carbon atoms, $R^{10}$ is a monovalent hydrocarbon radical having from 1 to 20 carbon atoms, b is a number of from 1 to 3, e is a number of from 0 to 4, m is 0, 1 or 2, and n is a number of from 1 to 5, with the proviso that $n=b-e+1$.

42. The method of claim 40, wherein the polyacrylate-containing compound is trimethylol triacrylate.

43. The method of claim 40, wherein the polyacrylate-containing compound is pentaerythritol triacrylate.

44. The method of claim 39, wherein the polyacrylate-containing compound is hexanediol diacrylate.

45. The method of claim 40, wherein the acrylate is a mixture consisting of a polyacrylate-containing compound and a monoacrylate-containing compound.

46. The method of claim 40, wherein the molar ratio of the polyacrylate containing compound to the amine groups of the aminofunctional silane is from 0.75 to 10.

47. The method of claim 40, wherein the reaction is conducted in the presence of an organic solvent.

48. The method of claim 40, wherein the aminofunctional silane is gamma-aminopropyltriethoxysilane.

49. The method of claim 31, wherein the organopolysiloxane is a cyclic trisiloxane.

50. The method of claim 49, wherein the reaction is conducted in the presence of a lithium compound.

51. The method of claim 50, wherein the lithium compound is lithium silanolate.

52. The method of claim 49, wherein the reaction is conducted at a temperature of from 70° to 150° C.

53. The method of claim 49, wherein the reaction is conducted in the presence of a hydrocarbon solvent.

54. The method of claim 49, wherein the molar ratio of acrylate-containing aminosilane to cyclic trisiloxane is from about 0.00015 to 3.

55. The method of claim 49, wherein the cyclic trisiloxane is hexamethylcyclotrisiloxane.

56. A method for coating a substrate which comprises applying the composition of claim 4 to a substrate and thereafter exposing the composition to a radiation source.

57. The method of claim 56, wherein the radiation source is ultraviolet light.

58. The method of claim 56, wherein the composition of claim 5, is applied to a substrate and thereafter exposed to a source of heat.

59. The method of claim 56, wherein the composition of claim 6 is applied to a substrate and thereafter exposed to a source of radiation.

60. The coated substrate obtained from the method of claim 56.

61. The coated substrate obtained from the method of claim 57.

62. The coated substrate obtained from the method of claim 58.

63. The coated substrate obtained from the method of claim 59.

* * * * *